(No Model.)  J. T. THOMSON.  3 Sheets—Sheet 2.
WIND WHEEL.
No. 337,094. Patented Mar. 2, 1886.
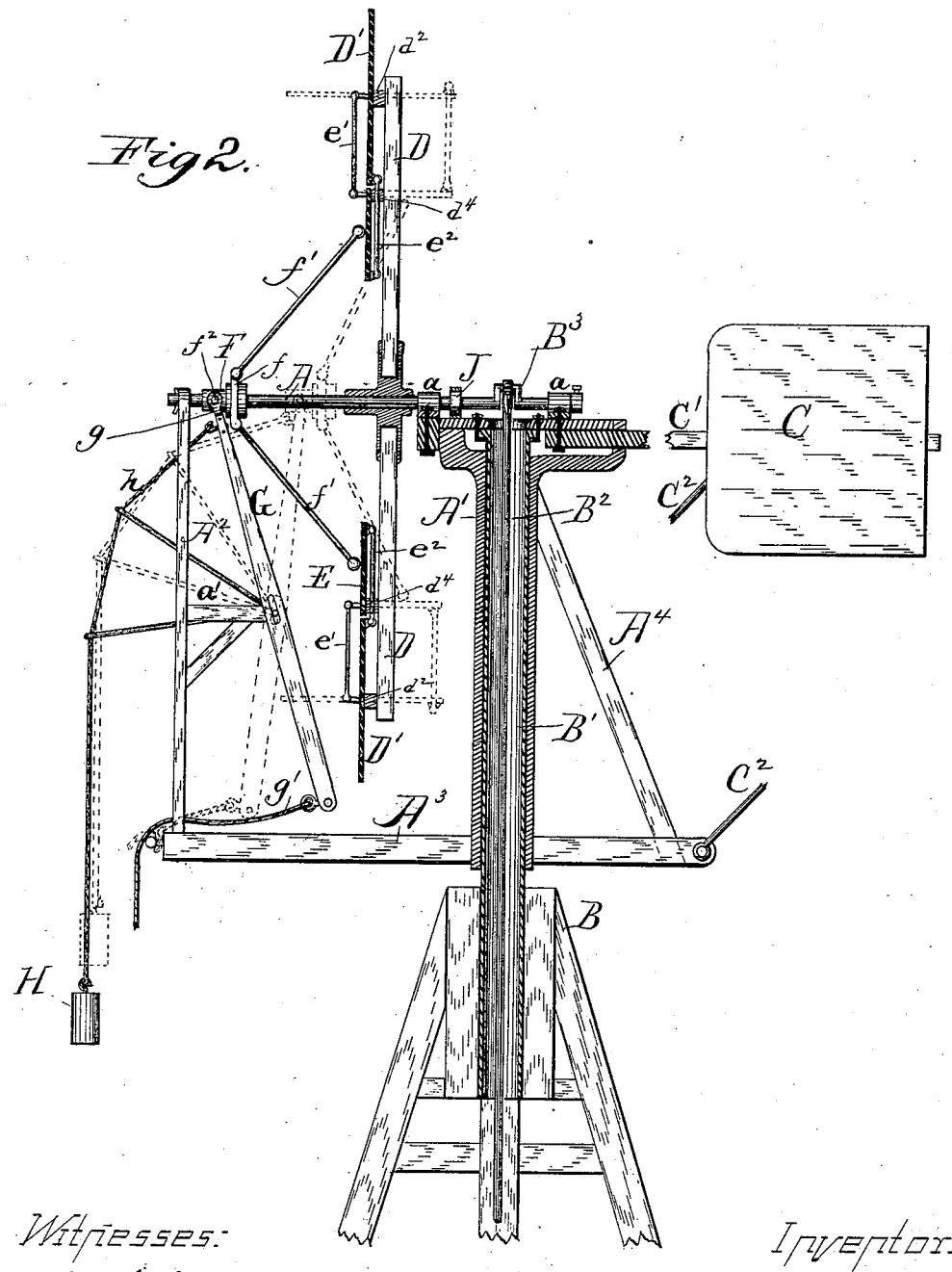

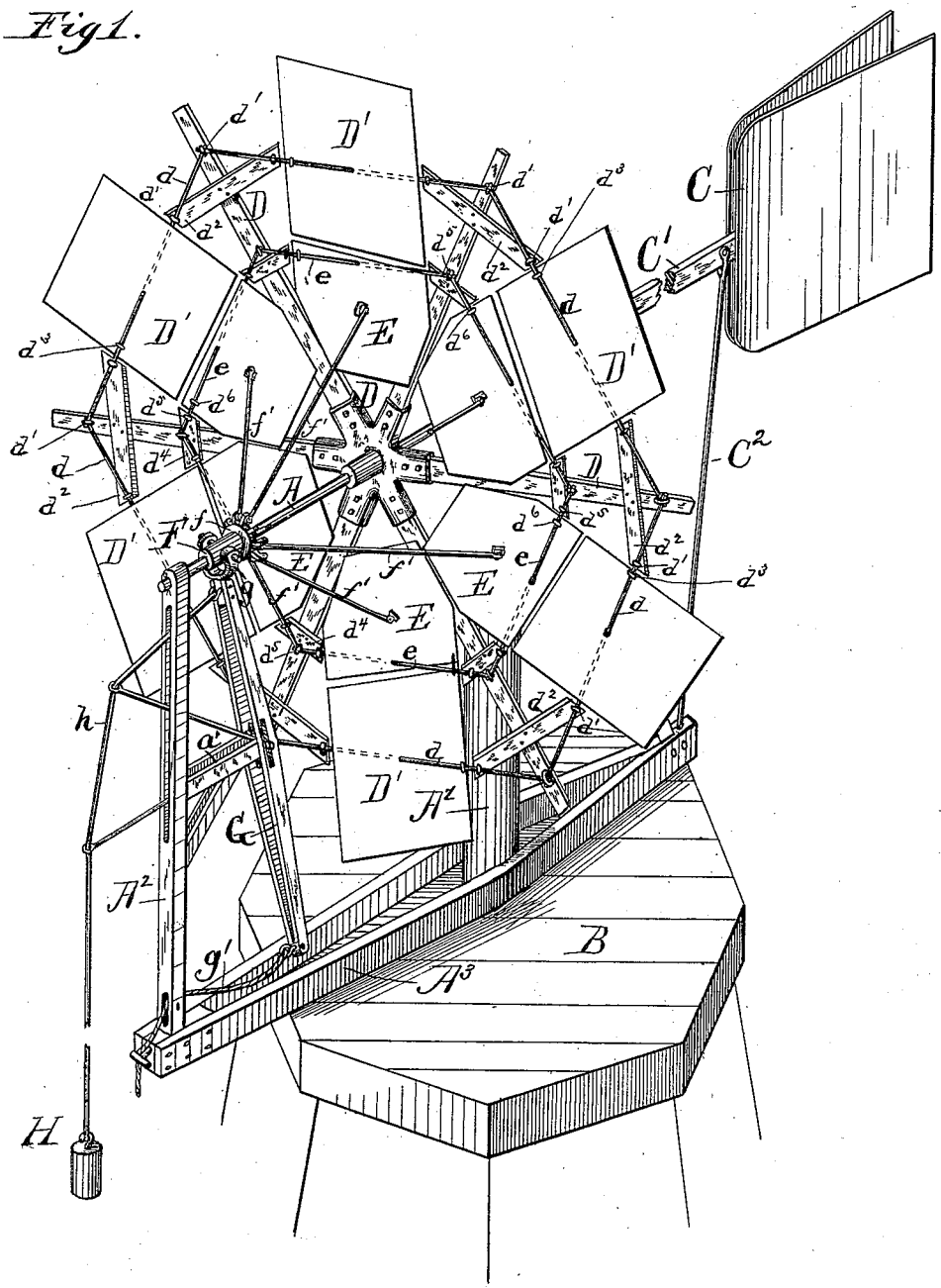

(No Model.) 3 Sheets—Sheet 3.
J. T. THOMSON.
WIND WHEEL.
No. 337,094. Patented Mar. 2, 1886.
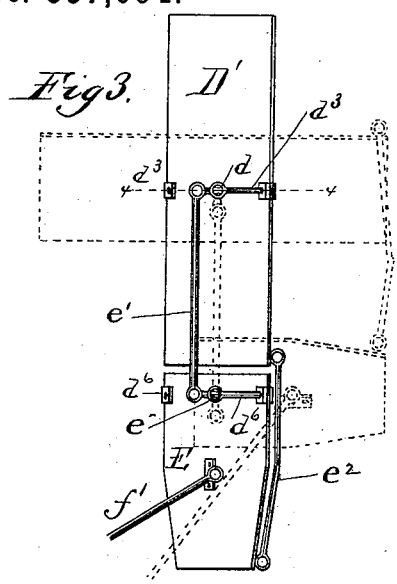
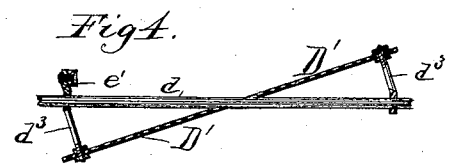
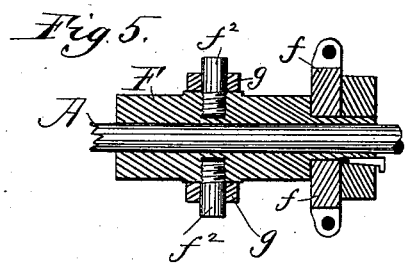
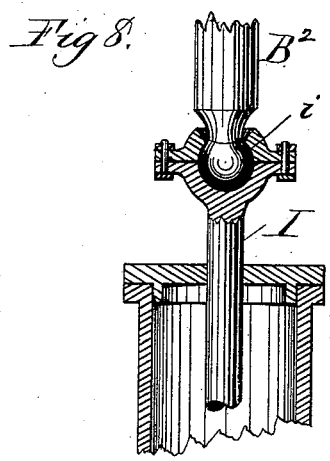
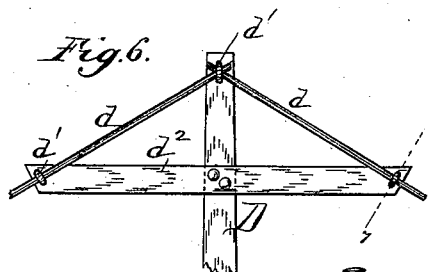
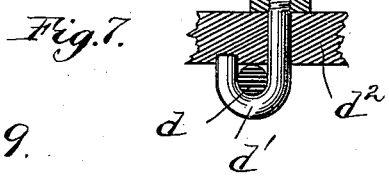
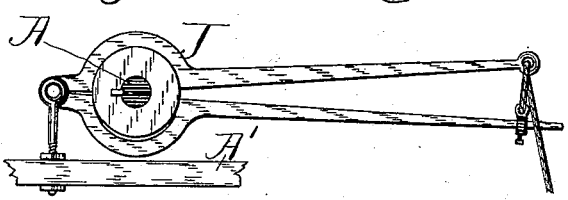
Witnesses:
Lew. E. Curtis.
Wm N Forrest.
Inventor:
John Turnbull Thomson
By Taylor E. Brown
his Attorney.
N. PETERS, Photo-Lithographer, Washington, D. C.

UNITED STATES PATENT OFFICE.

JOHN T. THOMSON, OF INVERCARGILL, NEW ZEALAND, ASSIGNOR TO JOHN CLAY, JR., AND WILLIAM H. FORREST, BOTH OF CHICAGO, ILLINOIS.

WIND-WHEEL.

SPECIFICATION forming part of Letters Patent No. 337,094, dated March 2, 1886.

Application filed September 29, 1884. Serial No. 144,282. (No model.) Patented in New Zealand July 14, 1882, No. 672.

*To all whom it may concern:*

Be it known that I, JOHN T. THOMSON, a citizen of Great Britain, residing in Lennel House, Invercargill, New Zealand, have invented a new and useful Improvement in Windmills, (for which I have obtained a patent in New Zealand, No. 672, bearing date 14th day of July, 1882,) of which the following is a specification.
This invention relates to that class of wind wheels or mills having vanes or sails adapted to be faced to the wind when required to work, and to be swung or edged from the wind when not in use; and to this end my invention consists in providing a wheel with two sets of vanes or sails, in one set the vane or sail being suspended or hung at or near its edge off balance, and the vanes or sails in the other set are suspended or hung at or near their center in counterpoise, and so connecting the vanes or sails of each set with each other by means of longitudinal rods, and also by means of radiating or converging rods meeting in a reciprocating swivel collar or boss, in order that all the vanes may be faced to or edged from the wind simultaneously.

It further consists in providing a weight attached to said reciprocating collar or boss, whereby the vanes or sails are faced to or edged from the wind automatically; and it also consists in providing means for controlling the vanes or sails through said collar or boss by means of a lever connected therewith.

I have shown a wind wheel or mill embodying the features of my invention in the accompanying drawings, which form a part of this specification, and in which similar letters of reference indicate like parts, wherein—

Figure 1 is a perspective view of the wind wheel or mill, the vanes or sails faced to the wind; Fig. 2, a central vertical section thereof. Figs. 3, 4, 5, 6, 7, 8, and 9 are enlarged detail views of parts more fully hereinafter explained.
In said drawings, A represents the main shaft or axle, which is secured at one end by suitable boxes or bearings, $a$, to the top of the revolving sleeve or bearing A', and at the other end it is supported in the vertical standard $A^2$. The standard $A^2$ and the sleeve A' are secured firmly together by means of the framing $A^3$ and brace rod or bar $A^4$. Within the sleeve A' and secured to the main frame B of the mill is the usual stationary hollow sleeve, B', through which power is applied or exerted by means of the pitman $B^2$ and crank $B^3$ on shaft or axle A.

C is the usual tail-vane, supported on the beam C', secured to the sleeve A' and braced by the rod or bar $C^2$. I prefer to make the tail-vane of two parts, as clearly shown in Fig. 1.

The wheel D is mounted or secured rigidly to the axle A to revolve therewith, and carries the vanes or sails D' D' and E E. The outer or main sails, D' D', are set or hung, preferably at or near the center, in counterpoise on the small wrought-iron rods $d$, which are firmly secured to the wheel D by bolts $d'$ and strengthened by cross bars or braces $d^2$, which project from each arm of the wheel. The sails D' D' revolve readily on the rods $d$, passing through them, and are held at a suitable angle to the face of wheel D by means of stay-rods $d^3$.

The inner or governing sails, E E, are set or hung near their outer edge, off balance, on small rods $e$, also secured to the arms of wheel D and cross-bars $d^4$ by bolts $d^5$. These sails E are also held or secured at an angle to the face of the wheel D by stay-rods $d^6$.

Each outer sail, D', is connected with one of the inner sails by fore and rear guide-rods, $e'$ $e^2$, as shown in Figs. 2 and 3, so that both will move simultaneously.

F is the non-rotating collar or boss, placed loosely on the axle A, so as to be easily moved forward or back thereon, having mounted in a suitable groove or recess therein the rotating or swiveling collar $f$, to which is secured one end of the rods $f'$. These rods $f'$ radiate from this collar, and are attached at their other ends each to one of the vanes or sails E E. When the mill is not in use or the sails require to be edged from the wind, the collar or boss F is moved toward the wheel, thus spreading the rods $f'$ and edging the sails, as shown by Fig. 2 in dotted lines, by means of the lever G, pivoted to the arm $a'$ on the standard $A^2$, and provided at its upper end with a yoke, $g$, fitting over the pins $f^2$, secured to the boss F. The lever G is secured in this position by a cord, $g'$. From the upper arm of the lever G, I suspend a weight, H, by means of a suitable cord, h, passing over a small pulley or through eyes of derrick-arms, as shown. When the lever G is unfastened, the weight H causes the boss F to slide or move out on the axle A, thus facing the sails to the wind and starting the mill. I maintain the velocity of the wind wheel or mill at the same speed by this weight H, the tension of which constantly balances the force of the wind impinging on the governing-sails E E, whose angle to the direction of the wind of course decreases as the force of the wind increases.

In Fig. 8 I show a convenient method of attaching the lower end of the pitman $B^2$ to the piston I of a cylinder or pump by a ball and socket, i, allowing the wheel and frame to revolve or rotate in any direction.

J is a common form of a friction-brake surrounding a disk or collar on the axle A, secured at one end to the sleeve A', and operated by means of a cord or chain secured to the lower lever or arm of the brake and passing through an eyelet or opening in the upper arm, thence to the ground. This is illustrated in Fig. 9.

When the mill is to be arrested, I unhook the weight H, throw the lever G, by means of the cord g, to the position shown in dotted lines in Fig. 2, and then brake the axle A by applying the brake J.

The vanes or sails I make of any suitable material, such as framing covered with canvas, galvanized iron stiffened with angle-iron, or light boards clamped with transverse pieces. The weight, in pounds, depends, of course, on the work required of it—that is, on the number of square feet in the regulating or inner sails. In a medium breeze, traveling at, say, eighteen feet per second, I would use a weight of three-fourths of a pound to the square foot.

I have shown the vanes or sails applied or attached between the arms of the wheel D; but I do not wish to limit myself to such construction, as it is obvious that other means of securing the sails may be employed, as they may be placed behind or before on the arms themselves with equal advantage. Nor do I wish to limit myself to the number of sails, as I may use one or more inner or governing sails to each ordinary outer sail; or I may use more than one outer sail to each arm and employ one governing-sail to operate them, and I may swing these sails, as shown, or roll them up, slide them together, or fold them close.

Instead of guide-rods $e\ e'$, but one rear guide-rod may be used, if affixed to a hinge or bracket projecting behind plane of sails.

What I claim, and desire to secure by Letters Patent, is—

1. A wind wheel or mill wherein the sails are secured to rods connecting the radial arms of the wheel, having some of said sails pivoted to said rods at or near their edge off balance, and other sails pivoted at or near their center in counterpoise, and mechanism, substantially as described, for facing or edging all the sails to or from the wind simultaneously.

2. In a wind-wheel wherein the sails are connected by radial rods to a reciprocating boss on the axle, the reciprocating non-rotating boss F, provided with a revolving collar, f, having proper lugs for securing said radial rods thereto, said non-revolving boss being also provided with pins $f^2$, so as to engage the end of the lever G, substantially as specified.

3. In a windmill, the sleeve-bearing A', surrounding the stationary sleeve B', said sleeve A' having a wind-wheel and a tail-vane mounted on its upper end, and the framing $A^3$, secured at its lower end, in combination with the standard or brace $A^2$, for supporting the wind-wheel axle A, and the brace-rod $C^2$, for supporting the vane C, substantially as specified.

4. A windmill-wheel consisting of the radial arms D, connected with bolts by the rods $d\ e$, each of said rods $d\ e$ having a sail mounted so as to revolve thereon, said sails being secured at a suitable angle longitudinally to said rods by stay-rods $d^3\ d^6$, substantially as and for the purpose specified.

5. In a windmill, the manner of securing the sails D' and E to the rods $d$ and $e$ at an angle by means of the stay-rods $d^3$ and $d^6$, substantially as shown and described.

In witness whereof I have hereunto set my hand this 4th day of August, A. D. 1884.

J. T. THOMSON.

Witnesses:
WM. McCULLOCH,
*Resident Magistrate, Invercargill, New Zealand.*
THOS. M. MACDONALD,
*Crown Solicitor, Invercargill.*